(12) United States Patent
Zhang

(10) Patent No.: US 9,051,158 B2
(45) Date of Patent: Jun. 9, 2015

(54) ELEVATOR CAR AND CONSTRUCTION METHOD

(75) Inventor: Ying Jin Zhang, Shanghai (CN)

(73) Assignee: Inventio AG, Hergiswil (CH)

(*) Notice: Subject to any disclaimer, the term of this patent is extended or adjusted under 35 U.S.C. 154(b) by 703 days.

(21) Appl. No.: 13/322,950

(22) Filed: Nov. 29, 2011

(65) Prior Publication Data

US 2013/0118841 A1    May 16, 2013

(51) Int. Cl.
*B66B 11/02* (2006.01)
*F16B 5/06* (2006.01)
*B23P 17/04* (2006.01)

(52) U.S. Cl.
CPC .......... *B66B 11/0253* (2013.01); *F16B 5/0635* (2013.01); *B23P 17/04* (2013.01)

(58) Field of Classification Search
CPC ........................ B66B 11/0253; F16B 5/0635
USPC ................ 187/401; 29/428, 429, 462, 525.01
IPC ........................................................ B66B 11/02
See application file for complete search history.

(56) References Cited

U.S. PATENT DOCUMENTS

| | | | |
|---|---|---|---|
| 1,718,014 A | 6/1929 | Westlin | |
| 2,942,309 A * | 6/1960 | Renaudin | 49/490.1 |
| 2,974,383 A * | 3/1961 | Bright | 24/564 |
| 3,411,190 A * | 11/1968 | Augier | 24/293 |
| 4,699,251 A * | 10/1987 | Orndorff et al. | 187/401 |
| 4,700,809 A * | 10/1987 | Lazar | 187/401 |
| 4,875,553 A * | 10/1989 | Smith et al. | 187/401 |
| 4,896,747 A * | 1/1990 | Inglis | 187/413 |
| 5,404,686 A * | 4/1995 | Esposito | 52/588.1 |
| 6,082,501 A * | 7/2000 | Lehmann | 187/401 |
| 2004/0020137 A1* | 2/2004 | Battey et al. | 52/36.1 |
| 2006/0175148 A1* | 8/2006 | Starace | 187/401 |
| 2007/0181383 A1* | 8/2007 | Bizarria Santos | 187/401 |
| 2009/0057070 A1* | 3/2009 | Maury | 187/401 |
| 2009/0200118 A1* | 8/2009 | Minami et al. | 187/401 |
| 2011/0100763 A1* | 5/2011 | Wiacek et al. | 187/401 |

FOREIGN PATENT DOCUMENTS

| | | | | |
|---|---|---|---|---|
| CA | 2445476 A1 * | 4/2004 | ......... | B66B 11/0253 |
| CN | 201071242 Y | 6/2008 | | |
| CN | 101484376 A | 7/2009 | | |
| CN | 102030242 A | 4/2011 | | |
| DE | 9405750 U1 * | 6/1994 | ......... | B66B 11/0253 |
| FR | 2719650 A1 * | 11/1995 | ......... | B66B 11/0253 |
| FR | 2729186 A1 * | 7/1996 | ............ | F16B 5/0635 |
| JP | 2000229771 A * | 8/2000 | ............. | B66B 11/02 |
| JP | 2002249291 A * | 9/2002 | ............. | B66B 11/02 |
| JP | 2003252550 A * | 9/2003 | ............. | B66B 11/02 |

(Continued)

*Primary Examiner* — William A Rivera
*Assistant Examiner* — Stefan Kruer
(74) *Attorney, Agent, or Firm* — Fraser Clemens Martin & Miller LLC; William J. Clemens

(57) ABSTRACT

An elevator car includes supporting sections, which are arranged on a car frame. Each supporting section has a foot, a first arm and a second arm. The foot is fastened to the car frame, at their free ends the arms converge and form a slit-shaped constriction, into which panel sections of panels that form walls or a ceiling can be clipped. The arms possess spring properties and, at the constriction, can be moved apart against a spring force. The arms hold the panel sections in position in the area of the constriction.

11 Claims, 4 Drawing Sheets

(56) References Cited

FOREIGN PATENT DOCUMENTS

| | | | | |
|---|---|---|---|---|
| JP | 2004067334 A | * | 3/2004 | ............. B66B 11/02 |
| JP | 2005343573 A | * | 12/2005 | ............. B66B 11/02 |
| JP | 2007-182292 A | | 7/2007 | |
| JP | 2010-195533 A | | 9/2010 | |
| WO | WO 2005014462 A1 | * | 2/2005 | ................ B66B 1/46 |

* cited by examiner

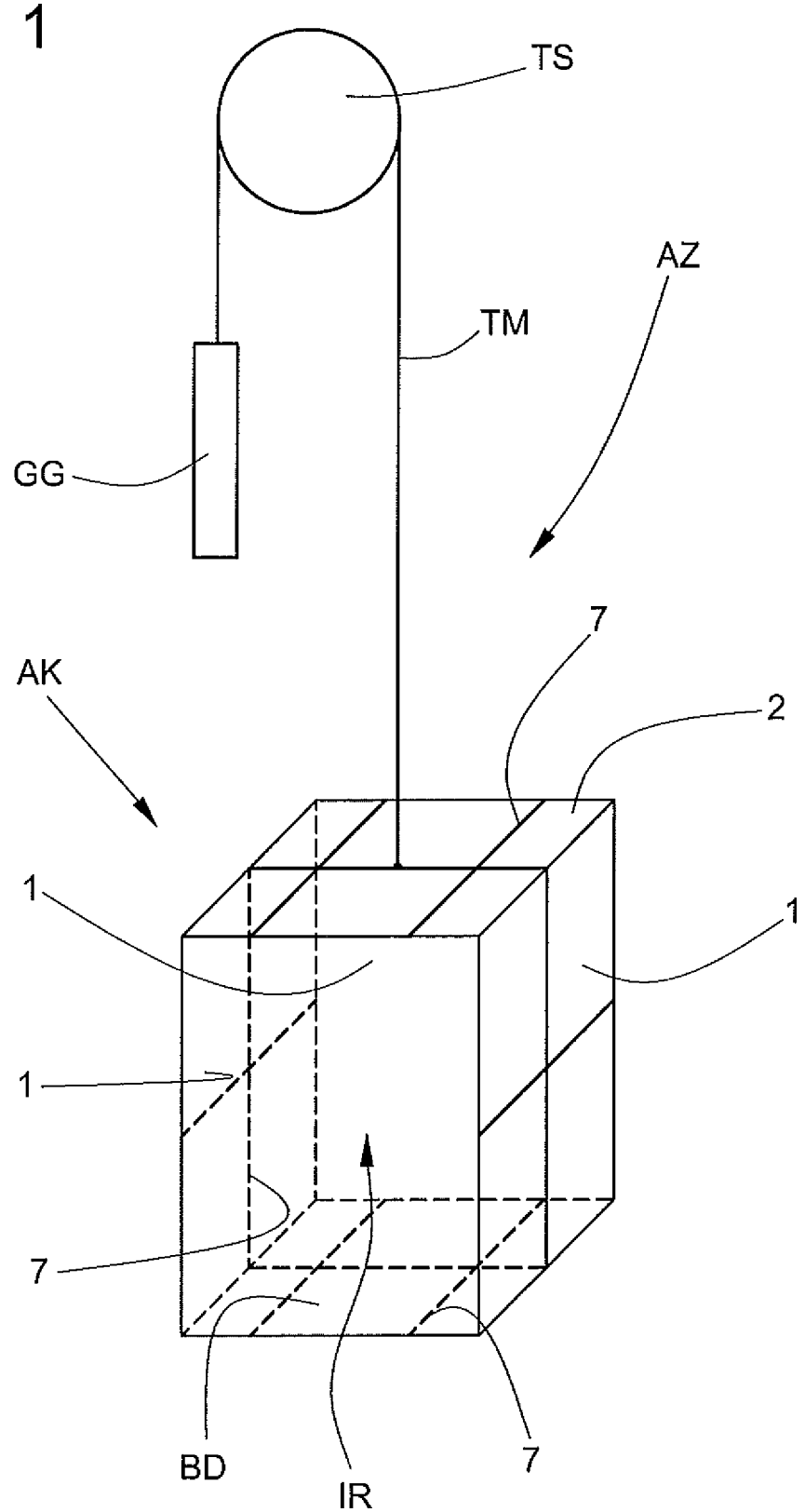

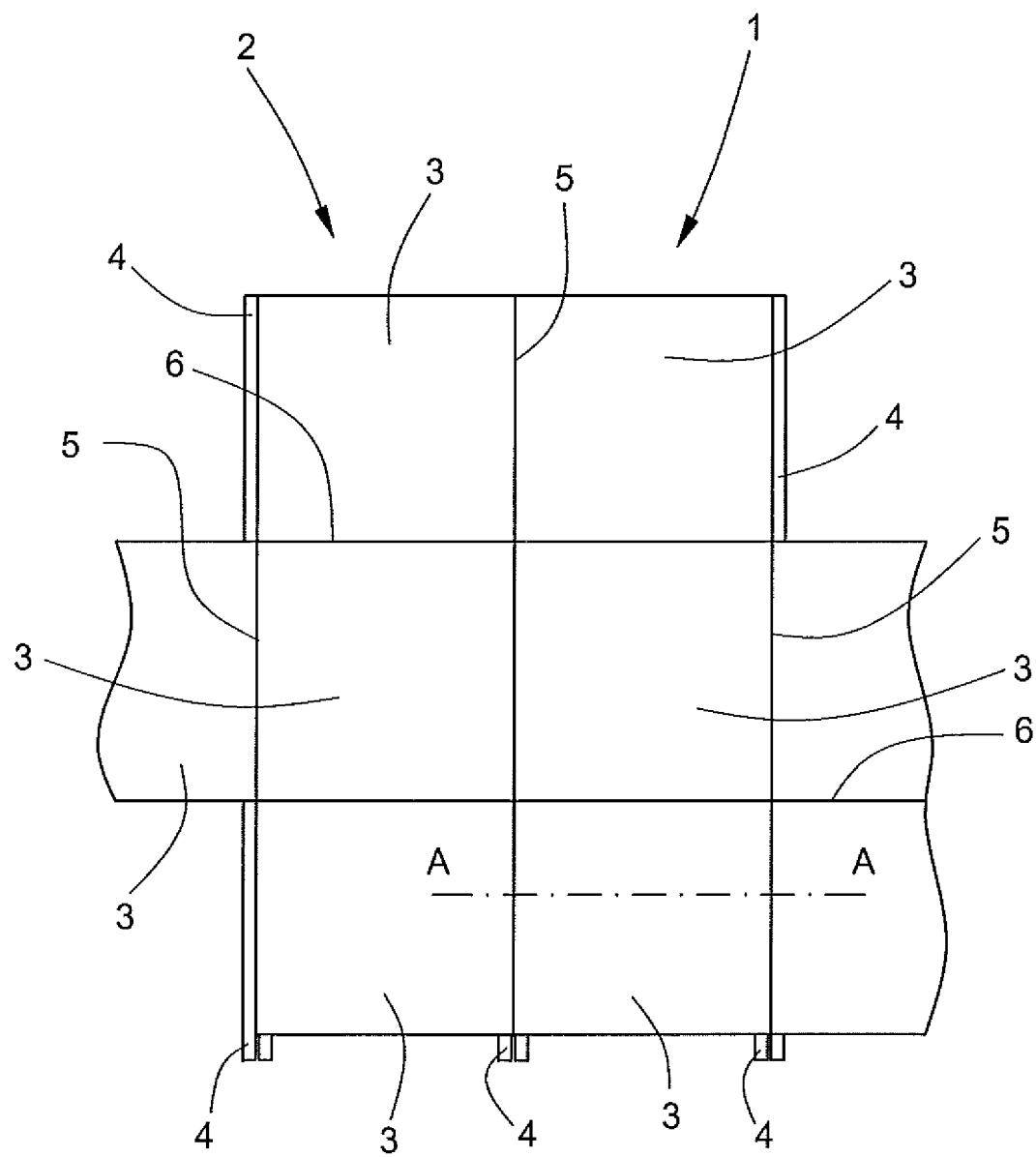

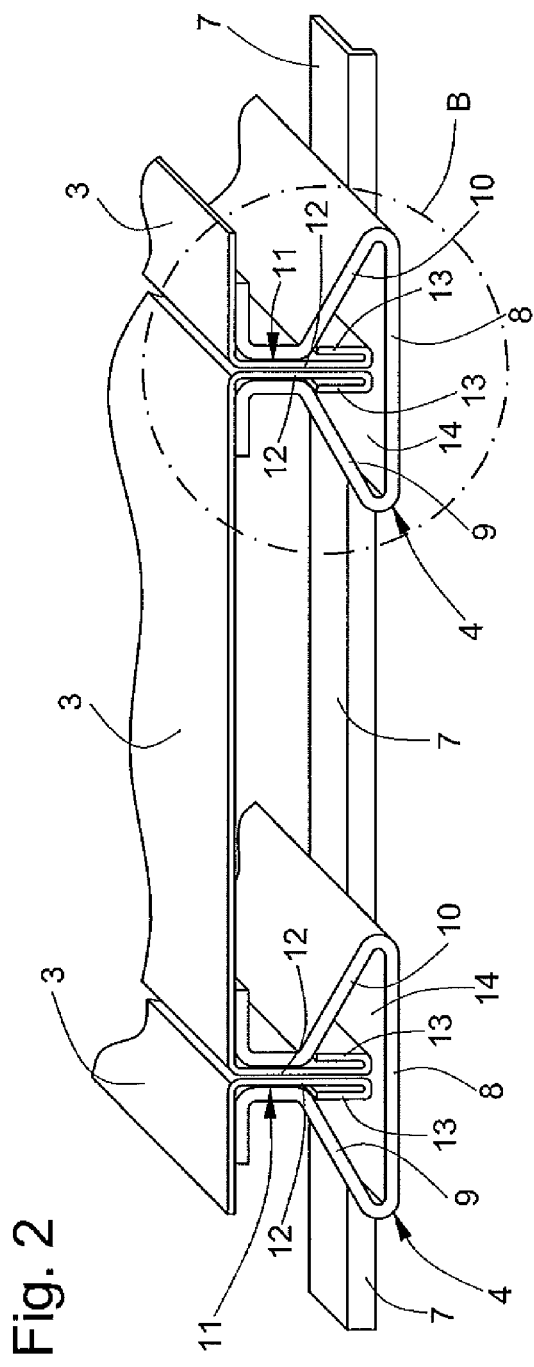
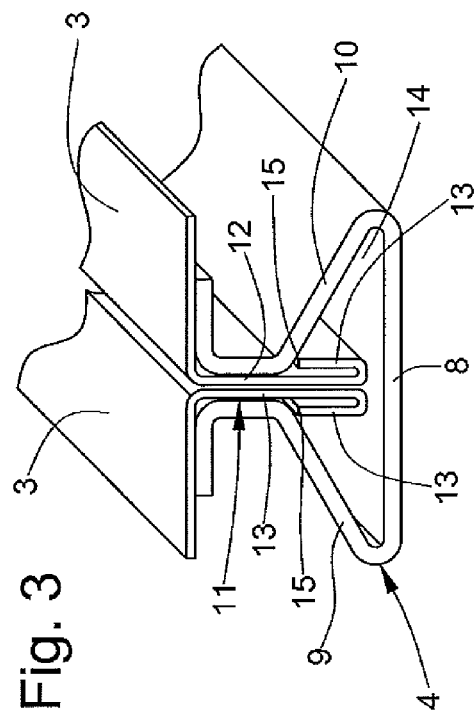
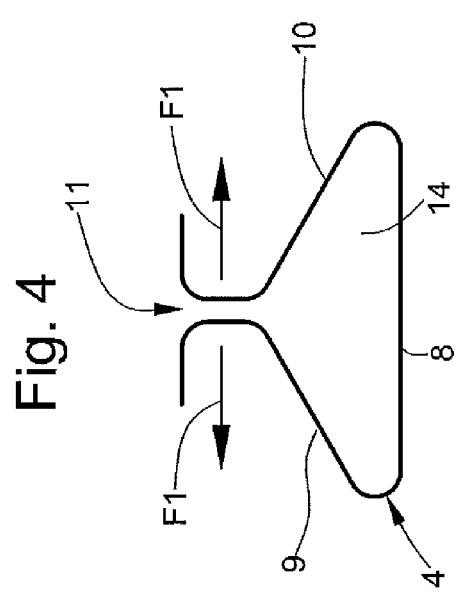

Fig. 5
Fig. 5a
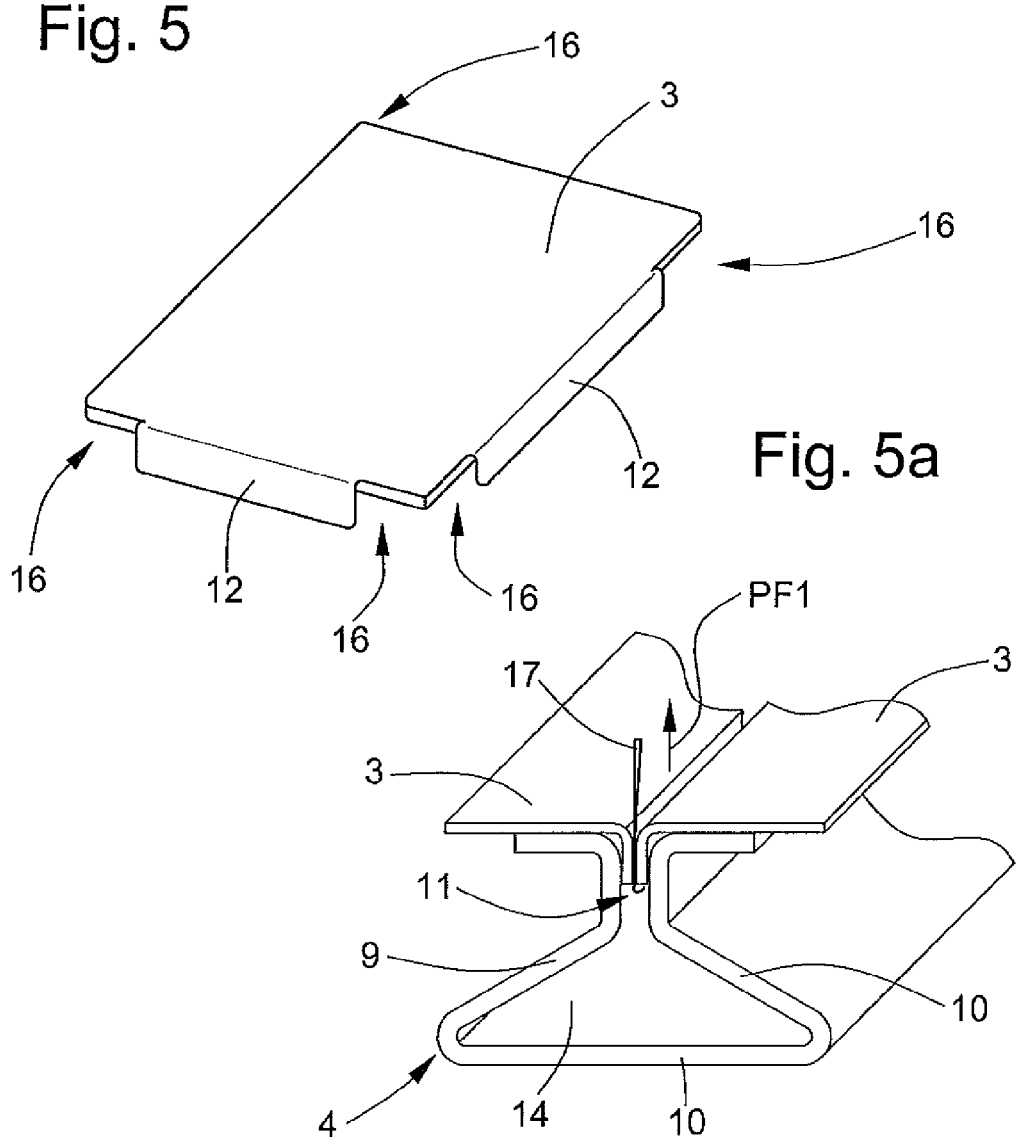
Fig. 6
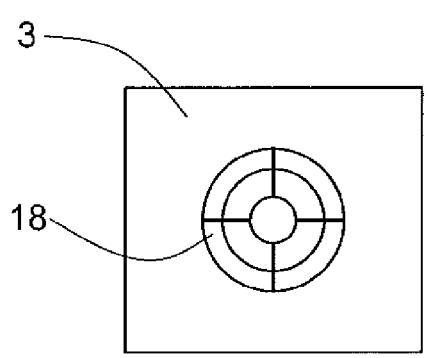
Fig. 7
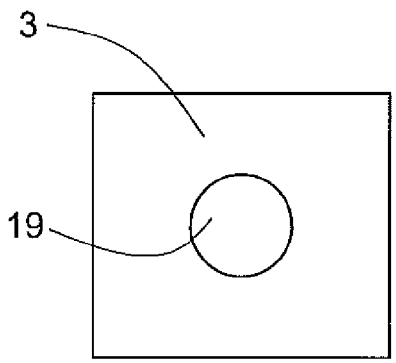

ELEVATOR CAR AND CONSTRUCTION METHOD

CROSS-REFERENCE TO RELATED APPLICATION

This application is a continuation of International Application No. PCT/CN2010/001910, filed Nov. 29, 2010, which is incorporated herein by reference.

FIELD

The disclosure relates to an elevator car.

BACKGROUND

From patent specification U.S. Pat. No. 1,718,014 an elevator car has become known whose walls form a passenger space or a freight space. The walls are composed of rectangular-shaped panels. At least along both of its long sides, each panel is bent, the panel section that is so bent by approximately 90° being bent along its edge by a further 90°. The bent panel section touches the bent panel section of the adjacent panel, a clamping section that releasably fastens the two adjacent panels at the bent edges being slideable over the bent edges along the long side of the panel. The car wall that is visible to the user of the elevator car therefore comprises a closed surface with only fine joint gaps between the panels. Disadvantageous with this type of panel fastening can be the difficult installation of the clamping sections, since the panels extend over the entire height of the car and, correspondingly, the clamping sections are pushed along the entire height of the car over the bent edges of the bent panel sections, the frictional force, and hence the force for pushing, continuously increasing on account of the clamping effect. Also, when replacing a panel, the clamping-section join can be disadvantageous, because for one panel two clamping sections must be removed and inserted again.

SUMMARY

At least some of the disclosed embodiments comprise car walls and/or a car ceiling with panels for an elevator car which are easily mountable and easily replaceable.

In at least some embodiments, the panels that form the car walls or car ceiling are installable and exchangeable from the interior space IR of the elevator car. Through the second fastening elements being fixed on the car frame, the panels can be easily mounted on the car from the inside and, in case of need, removed or dismantled again from the same side. During mounting and removal, the second fastening elements, which are fixed to the car frame by, for example, welded, screwed, or other fastenings, remain fastened to the car.

In various embodiments, sections that are fastened to the car frame can serve the panels as supports, the edges of the panels being clippable onto the, for example, omega-shaped supporting sections. The walls and/or the ceiling of the elevator car can be installed in a short time, and individual panels are also easily replaceable or exchangeable. The installation allows, for example, the optical appearance of the walls and/or of the ceiling to be changed without great outlay. For example, the color scheme of or pictures on, the walls and/or ceiling can be changed in a short time.

BRIEF DESCRIPTION OF THE DRAWINGS

Various exemplary embodiments of the disclosed technologies are described in greater detail below by reference to the attached figures. Shown are in:

FIG. 1 an elevator with an elevator car and a counterweight;
FIG. 1a an exemplary embodiment of panels that form a car wall or a car ceiling;
FIG. 2 a cross section along the line A-A of FIG. 1a;
FIG. 3 a cross-section B of FIG. 2, with details of a clip-in fastening between supporting sections and panels;
FIG. 4 the characteristics of a supporting section;
FIG. 5 details of a panel;
FIG. 5a a cross section through two adjacent panel corners;
FIG. 6 and FIG. 7, car equipment that is installable in the car walls or in the car ceiling.

DETAILED DESCRIPTION

FIG. 1 shows an elevator AZ with an elevator car AK and a counterweight GG. A suspension means TM connects the elevator car AK and the counterweight GG and is passed over a traction sheave TS, which drives the suspension means TM. The elevator car AK is composed essentially of a car frame 7, which is connected to the suspension means TM and supports a floor BD, walls 1, and a ceiling 2. Further components of the elevator car, for example the car doors, are not shown.

FIG. 1a shows an exemplary embodiment of panels 3 that form a car wall 1 or a car ceiling 2. With at least two first fastening elements 12,13, which are shown in FIG. 2, each panel is clippably arranged on at least two second fastening elements 4, the second fastening elements 4, which are part of a clip-fastening, being arranged on the car frame 7. The car frame 7 is guided on guiderails and, as stated above, connected to the suspension means TM, which is movable by means of the traction sheave TS of an elevator drive.

FIG. 1a shows several panels 3, which are arranged on supporting sections 4, each panel 3 being clippably arranged on two supporting profiles 4 that run parallel. Between two adjacent panels 3, a fine, first joint gap 5 is formed by the clippable joint. On the panel sides without clip-in fastening, the panels 3 rest loosely against each other and form a fine, second joint gap 6. Along wall edges or ceiling edges, the two fastening elements 4, hereinafter referred to as supporting sections 4, are engaged with clip-in fasteners from one side only, the other supporting sections 4 are engaged with clip-in fastenings from two sides.

As a variant embodiment of a car wall or car ceiling, additional supporting sections can be provided which run perpendicular to the supporting sections 4 that are shown. In this variant, the panels are clip-fastenable on, for example, four sides.

Size and/or shape and/or surface of the panels 3 can be different. Square, as shown in FIG. 1a, or rectangular, or other shapes, or several shapes mixed, are possible. The supporting sections 4 shown in FIG. 1a can, for example, also be wave-shaped, curved, or zigzag-shaped.

FIG. 2 shows a cross section along the line A-A of FIG. 1a through the, for example, approximately omega-shaped supporting sections 4 and through the panels 3. The supporting sections 4 are arranged on the diagrammatically illustrated car frame 7 or on the parts that are fastened to the car frame 7. Each supporting section 4 has a foot 8, a first arm 9, and a second arm 10. The foot 8 is fastened to the car frame 7, at their free ends the arms 9,10 converge and form a slit-shaped constriction 11, through which the edges of two panels 4 are clippable. The arms 9,10 possess spring properties and, when clipping-in the panel edges on the constriction 11, can be moved apart by means of a force F1, which is shown in FIG. 4.

Instead of the shown approximately omega-shaped supporting sections 4, supporting sections 4 can be used which, in cross section, are, for example, approximately circular or triangular and provided with a constriction 11. Independent of a concrete shape of a supporting section, it can be moved apart at a constriction when a panel 3 is inserted. Furthermore, the shape is so selected that a secure holding in position of a panel 3 can be assured.

In the exemplary embodiment shown, at the edges along at least two parallel sides, each panel is bent into first fastening elements 12, 13, a first panel section 12 which is bent by approximately 90° being bent by a further 180° into a second panel section 13. The bent first panel section 12 strikes against the bent first panel section 12 of the adjacent panel 3. The bent second panel section 13 of the panel 3, together with the bent second panel section 13 of the adjacent panel 3, is pushed through the constriction 11, whereby the forces F1 shown in FIG. 4 are generated, and the free arms 9,10 are moved apart. After complete clipping-in of the second panel section 13, through their spring properties the arms move in opposite directions at the constriction 11 and hold the first panel sections 12 tightly together.

Instead of being bent, the panel sections 12,13 of the panels 3 can also be welded or bonded with adhesive onto the panel 3. The first panel section 12 and the second panel section 13 can be replaced by a single panel section that fulfils the function of the panel sections 12,13. This panel section can be, for example, drop-shaped or wedge-shaped, etc.

As shown in FIG. 3, the second panel sections 13 are in the clipped-in position in a hollow space 14 of the supporting section 4, an end 15 of the second panel section 13 resting against one of the arms 9,10 without hooking-in, and holds the panel 3 in an approximately vertical plane of a wall or ceiling surface which is formed by the panels 3.

FIG. 5 shows details of an exemplary embodiment of a panel 3. On the panel corners, the bent panel sections 12,13 have cutaways 16. In such a cutaway 16, the first panel section 12 is embodied only as a stub, the second panel section 13 is entirely absent.

FIG. 5a shows a cross-section through two adjacent panel corners, which have cutaways 16 according to FIG. 5. A tool 17, for example a hook, can be pushed between the stub-like first panel sections 12 and hooked into the panel stub. With this tool 17 a panel is non-destructively removable, replaceable, or exchangeable by the tool 17 being moved in the direction of the arrow PF1. The panel sections 12,13 thereby leave the supporting section 4 non-destructively.

Also possible are panels 3 without cutaways 16 at their corners. The panels 3 shown in FIGS. 1a, 2, and 3 can be embodied with or without cutaways 16. If no cutaways 16 are present, in one case, for example, small holes are provided at the panel corners, through which the aforementioned tool 17 can be inserted. Otherwise, tools 17 are used that operate, for example, on a vacuum principle, or on a magnet principle, and adhere to the panel surface.

FIG. 6 and FIG. 7 show exemplary car equipment that can be built into the car walls or into the car ceiling. Individual panels 3 can be provided with, for example, a ventilation grille 18 or with a lighting device 19.

As variant embodiment, the panels can be fastenable with other fastening means that operate, for example on a push-button principle, or using a hook-and-loop fastener (e.g., Velcro), or on a magnet principle.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. An elevator car, comprising:
    a car frame;
    a car floor, a car ceiling and car walls each fastened to the car frame and cooperating to form an interior space of the elevator car;
    a plurality of panels, the plurality of panels forming at least one of the car wall and the car ceiling;
    first fasteners on the panels; and
    second fasteners, the plurality of panels being clippably held in place by the first and second fasteners, the second fasteners being arranged on the car frame each of the panels of the plurality of panels being installable onto the car frame from within the interior space by engagement of the first fasteners with the second fasteners, and each of the panels being non-destructively removable from the car frame from within the interior space without moving any of the car floor, the car ceiling, the car walls and any other one of the plurality of panels relative to the car frame.

2. The elevator car of claim 1, further comprising supporting sections, the supporting sections comprising the second fasteners.

3. The elevator car of claim 2, the first fasteners comprising panel sections, the panel sections being clipped to the supporting sections.

4. The elevator car of claim 3, each of the supporting sections comprising a respective foot and respective two arms, the two arms having spring properties and holding one of the panel sections in position.

5. The elevator car of claim 3, the panel sections comprising respective corners, one or more portions of the panel sections having been cutaway at the respective corners.

6. The elevator car of claim 1, further comprising a piece of car equipment built into one of the plurality of panels.

7. The elevator car of claim 1, the plurality of panels forming a car wall.

8. The elevator car of claim 1, the plurality of panels forming a car ceiling.

9. An elevator installation comprising:
    an elevator car, the elevator car comprising,
        a car frame,
        a car floor, a car ceiling and car walls each fastened to the car frame and cooperating to form an interior space of the elevator car,
        a plurality of panels, the plurality of panels forming at least one of the car wall and the car ceiling,
        first fasteners on the panels, and
        second fasteners, the plurality of panels being clippably held in place by the first and second fasteners, the second fasteners being arranged on the car frame, each of the panels of the plurality of panels being installable onto the car frame from within the interior space by engagement of the first fasteners with the second fasteners, and each of the panels being non-destructively removable from the car frame from within the interior space without moving any of the car floor, the car ceiling, the car walls and any other one of the plurality of panels relative to the car frame.

10. An elevator car construction method, comprising:
    attaching a first plurality of panels to a car frame from an interior space of the car frame to form a car wall; and
    attaching a second plurality of panels to the car frame from the interior space of the car frame to form a car ceiling, the first and second plurality of panels being clippably held in place by first fasteners on the panels and second fasteners, the second fasteners being arranged on the car frame, each of the panels being installable onto the car frame from within the interior space by engagement of the first fasteners with the second fasteners, and each of the panels being non-destructively removable from the car frame from within the interior space without moving any of a car floor, the car ceiling, the car wall and any other one of the panels relative to the car frame.

11. The elevator car construction method of claim 10, the attaching of the first plurality of panels and the attaching of the second plurality of panels being performed without a tool.

\* \* \* \* \*